Oct. 15, 1940.   T. N. FRITZSCH   2,218,262
TRUCK
Filed Aug. 15, 1939   2 Sheets-Sheet 1
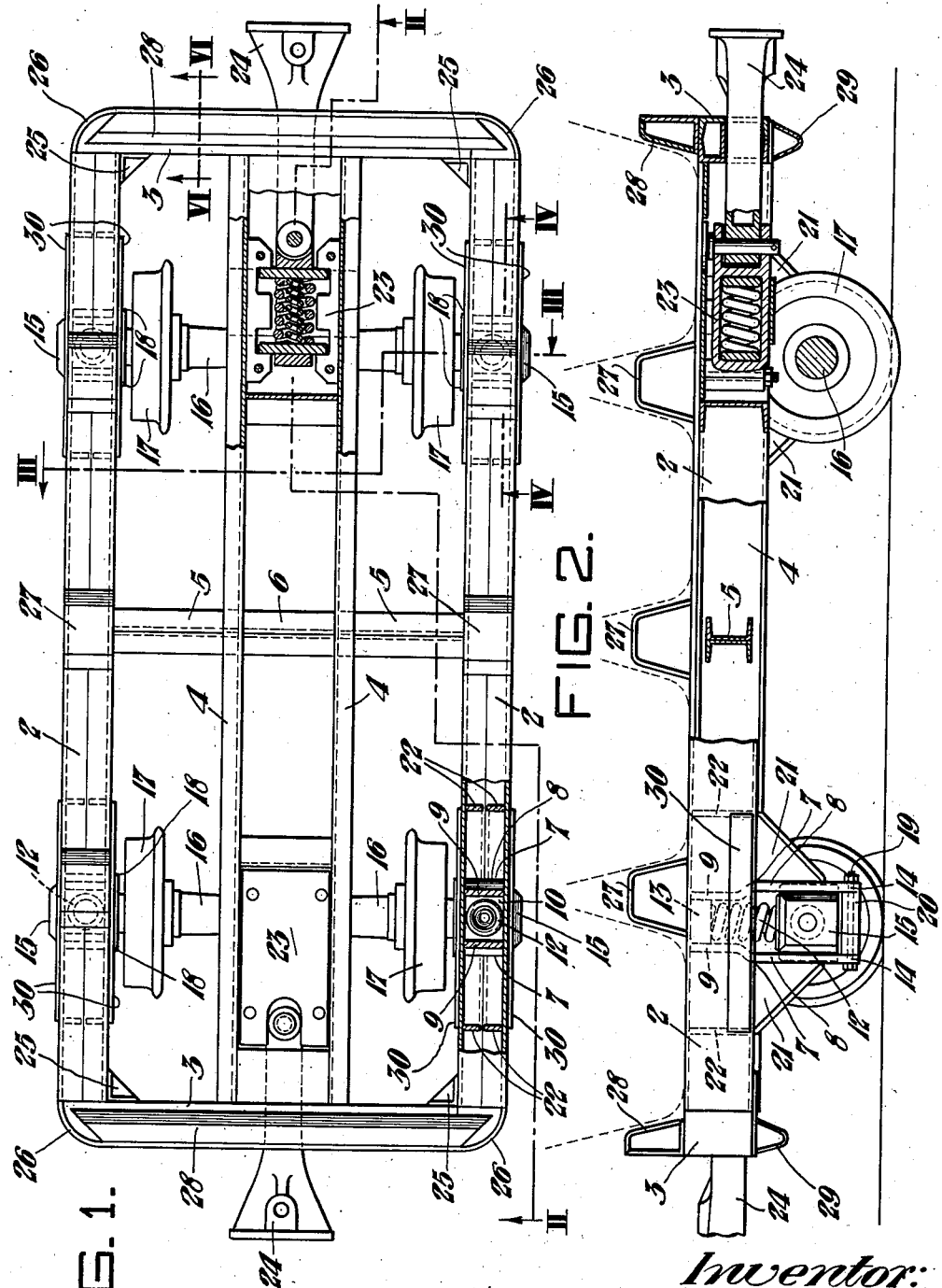
Inventor:
THEODORE N. FRITZSCH,
by: John E. Jackson
his Attorney.

Oct. 15, 1940. T. N. FRITZSCH 2,218,262
TRUCK
Filed Aug. 15, 1939 2 Sheets-Sheet 2
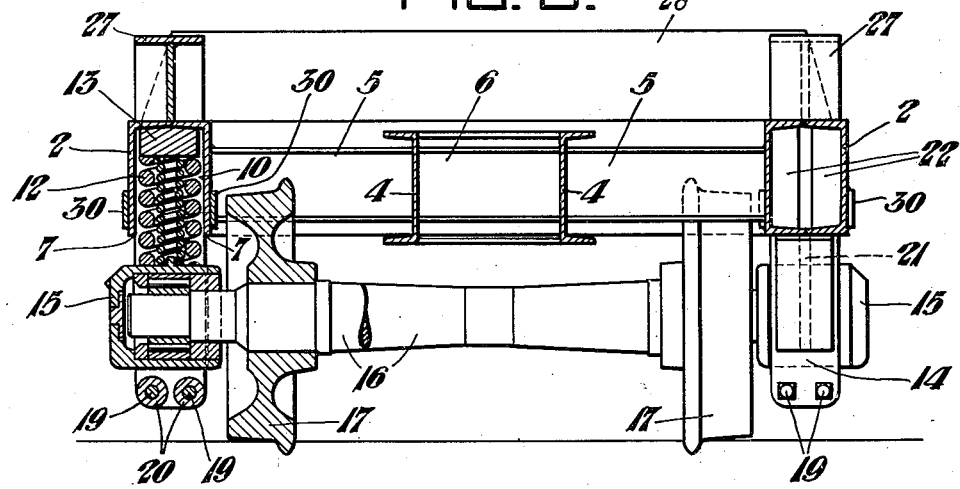
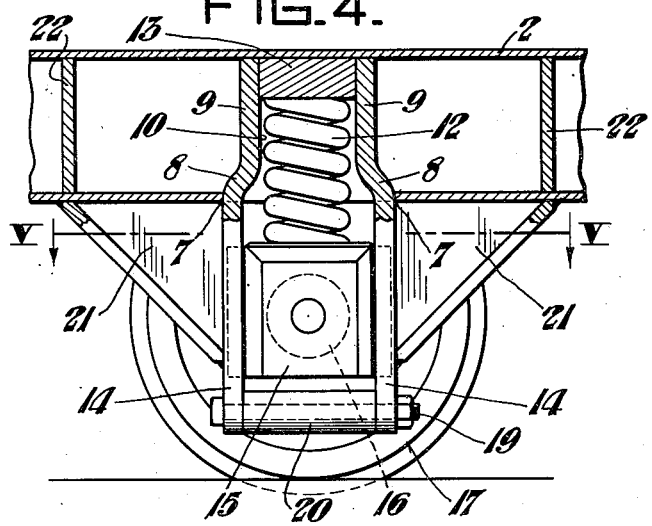
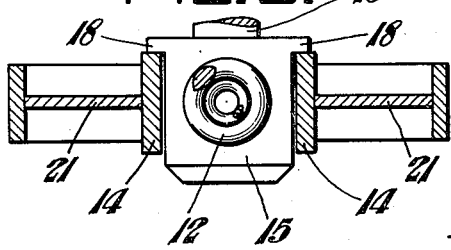
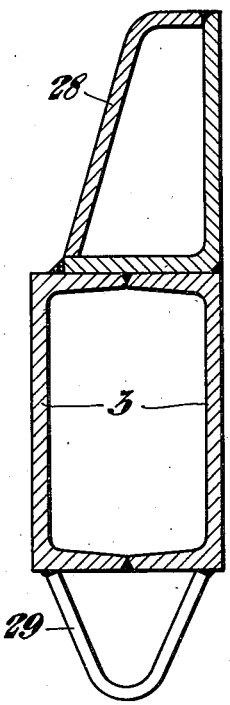
Inventor:
THEODORE N. FRITZSCH,
by: John E. Jackson
his Attorney.

Patented Oct. 15, 1940

2,218,262

UNITED STATES PATENT OFFICE 2,218,262

TRUCK

Theodore N. Fritzsch, Johnstown, Pa.

Application August 15, 1939, Serial No. 290,297

9 Claims. (Cl. 105—157)

This invention relates to trucks, and, particularly, to an improved railroad car or truck as is used especially for transporting charging boxes, steel ingot molds and the like in the steel industry.

Generally, cars or trucks that are employed for transporting charging boxes, and other extremely heavy objects and articles from one point to another in a steel manufacturing plant, as is well known to those engaged therein, are of a limited length so as to enable them to take a small radius curve or turn without the aid of auxiliary car trucks; in fact, such cars or trucks are about the same size as the railroad trucks ordinarily employed for supporting each end of a regular size railroad car. In such charging box trucks or cars, the load thereon is supported through four points, namely, by the spring seats; while, in the ordinary railroad cars which are relatively long, the load is supported through two points, namely, by the truck bolster plates.

The ingot mold or charging box truck or car of the type to which the present invention relates usually has the two points of support on each side of the car interconnected by a structural member running the length thereof, such members being commonly called the side sills. Such a car or truck, in general, consists usually of two such side sills, four spring seats, two end sills, and a flat top plate or body member. The height of such a car, in most cases, is limited for various reasons, and this factor heretofore has led to difficulty in providing sufficient room for the spring seats, the springs, the journal boxes, and the journal box guides thereunder, especially in view of the fact that the side sills are usually underslung to such a great degree for the reason that they are generally made as large as possible in order to carry the extreme loads to which they are subjected.

Heretofore, in order that the height of the car be at a minimum or within any given height, the spring seats or housings and journal box guides were usually positioned on either side of the side sills, such side sills usually being a straight I-beam or some similar structural member. But a car or truck of such construction was unsatisfactory in that the loads thereon were not properly transmitted to the main points of support; that is, directly to the side sills, but to either side of them. Also, in such a construction, the loads cause eccentric loading of the side sills and eventual bending thereof which, of course, necessitated heavier side sills or additional reenforcing cross members in the car construction.

In cars or trucks of other constructions, the side sills were usually interrupted; that is, a portion thereof was eliminated or cut away in order to receive and accommodate the spring seat and journal box guides, and additional structural members running parallel to the side sills had to be provided to support the same. Although the loads in cars or trucks of such construction were supported by the spring supports which were in line with the side sills, additional structural members had to be provided, as stated, in order to support the loads transmitted to the spring seats or housings. The cutting away of the side sills, or interrupting of the same for such purposes, weakened the same and also additional strengthening cross members had to be provided. Thus, it will be seen that cars constructed in such a manner required an excessive number of parts, and were expensive to construct and assemble.

In the present invention, there is provided a car or truck for transporting charging boxes in which all of the above disadvantages have been eliminated and a car in which the number of parts have been reduced to a minimum.

Accordingly, it is one of the objects of the present invention to provide an improved car or truck for transporting charging boxes and the like which is simple and inexpensive in its construction and, yet, one which is strong and rugged.

It is another object of the invention to provide an improved car or truck for transporting ingot molds, charging boxes and the like which has a minimum height and, consequently, one in which the center of gravity is as low as possible.

It is a further object of the invention to provide an improved car or truck for transporting ingot molds, charging boxes and the like which is of an entirely welded construction and one in which the loads thereon are transmitted directly to the side sills thereof.

Various other objects and advantages of this invention will be more apparent in the course of the following specification and will be particularly pointed out in the appended claims.

In the accompanying drawings there is shown, for the purpose of illustration, one embodiment which my invention may assume in practice.

In these drawings:

Figure 1 is a plan, partly in section, of the improved truck or car of my invention;

Figure 2 is an elevation thereof taken on line II—II of Figure 1;

Figure 3 is an end view taken on line III—III of Figure 1;

Figure 4 is an enlarged section taken on line IV—IV of Figure 2;

Figure 5 is a section taken on line V—V of Figure 4; and

Figure 6 is an enlarged section taken on line VI—VI of Figure 1.

Referring more particularly to the drawings, the improved car or railroad truck of my invention comprises a body member consisting of a pair of longitudinally extending side sill members 2 having a box-shaped cross section, spaced apart slightly more than the gage of the track on which the truck is adapted to be used. There is arranged across each end of the side sill members and preferably welded thereto an end sill member 3 having a similar box-shaped cross section. Both the side sill members and end sill members may be constructed in any suitable manner, but they are preferably formed by welding together two channel members, such as ship channels.

There is disposed centrally between the side sill members 2 and substantially parallel thereto, a pair of spaced apart longitudinally extending reenforcing channel members 4 having their ends attached to the inner walls of the end sill members 3, and there is positioned between each of the reenforced channel members 4 and the respective side sill 2 centrally of the body member, a laterally extending reenforcing member 5 and between the reenforced channel members 4 in alignment with the reenforcing members 5, there is disposed a reenforcing member 6. Both the reenforcing members 5 and 6 may be an I-beam or any other suitable member, but they are preferably formed by welding the two channel members together by their back sides opposite the channel portion thereof.

According to the present invention, there is arranged in the bottom sides of each of the side sill members 2, at a point directly above where each of the axles of the truck is adapted to be positioned, a rectangular-shaped opening 7 which is formed by cutting away a portion of the bottom wall of the side sill members. In each of the openings 7 in the side sill members, there is positioned a pair of vertically disposed spaced apart plate-like members 8, substantially equal in width to the inside width of the box-shaped sill members to which they are welded and having upper offset portions 9 which are disposed within the side sill members with the upper ends thereof abutting against the inner side of the top wall of the side sills so as to form a housing 10 therein for the coil springs 12 of the truck. There is disposed in each of the housings 10 against the inner side of the top wall of the side sill members and extending between the vertically disposed portions 9, a spring seating member or block 13 primarily for the purpose of adjusting the height of the car or truck by changing the same, if desired.

The lower portions 14 of each of the vertically disposed members 8 extend downwardly from the openings 7 and straddle the journal boxes 15 disposed on each end of the axles 16 outside of the wheels 17 thereon and act as a housing and guide therefor in their vertical movement therebetween. Each of the journal boxes 15 has a flanged portion 18 disposed at each side thereof at their inner sides which abut against and cooperate with the inner edges of each of the lower portions 14 of the vertically disposed members 8, as shown in Figure 5, so as to prevent lateral movement of the axles together with the journal boxes relative to the truck body and also to aid in guiding the journal boxes in their vertical movement between the members 8. There is arranged between the vertically disposed members 8 adjacent the ends of the lower portions 14 thereof below the journal boxes 15, means such as a pair of bolts 19 and sleeve members 20 which are adapted to maintain the lower ends of the members 8 in spaced relation and to retain the journal boxes in position therebetween in the event the car or truck is lifted from the ground or tracks.

Each of the vertically disposed members 8 is additionally strengthened preferably by means of triangular-shaped gusset members 21 which extend between the bottom side of the side sill members and the outer sides of the members 8, and there is disposed within the side sill members 2 adjacent the outer ends of each of the gusset members 21, preferably a laterally extending reenforcing plate member 22 for strengthening the side sill members in the vicinity of the openings 7 therein. Also on each side of the side sill members 2 in the vicinity of each of the openings 7 therein, there is arranged preferably a strap-like reenforcing or strengthening member 30 which extends along the lower sides of the side sills from points substantially opposite the reenforcing plates 22 therein and therebetween as shown in Figures 1 and 2 of the drawings, and which are adapted to stiffen the side walls of the side sill members at this point.

There is suitably arranged as shown between the spaced apart longitudinally extending reenforcing channel members 4 at each end of the truck body, a car coupling assembly 23 having a coupling member 24 extending outwardly from the ends of the body for attaching a number of cars or trucks together.

In each of the inner corners of the body between the side sill members and end sill members, there is preferably disposed an angle iron member 25 and at the outer corner thereof preferably an arcuate-shaped member 26 for the purpose of finishing and strengthening the corners of the truck body.

There may be disposed on the body member a suitable load supporting platform or floor, if desired, but if the truck is to be used for transporting charging boxes, it is preferable that there be arranged along the top side of the side sill members, a plurality of inverted U-shaped members 27 spaced apart a distance slightly more than the width of the bottoms of the charging boxes and an elongated member 28 having substantially a box-shaped cross section disposed at each end of the body on the top side of the end sill members 3 to which they are attached, and extending laterally substantially the length thereof. There is preferably arranged along the bottom side of each of the end sill members 3 a V-shaped finishing and bumper or ledge member 29.

While all of the parts of the body may be held together by means of bolts, rivets, or any other suitable mechanical means, it is preferable that all of the parts be welded together, that is, the entire car or truck is preferably of a welded construction. It will be seen that each of the side sills is a unitary member with the ends thereof overhanging the points of support, that is, the spring seats 13, and with the points of support being positioned in alignment with each of the side sills 2; thus, the loading thereon is concentric therewith.

The improved car or truck of the present invention not only has all of the attributes of a car for such a purpose, but it also has the advantage that it can be easily constructed and assembled. It will be understood that after the car body has been formed and all of the structural parts assembled therein and welded thereto, the coil springs 12 are positioned in each of the housings 10 on top of the spring seats 13 ready to receive the axle and journal box assemblies. The journal boxes 15 on the ends of the axles 16, together with the wheels, are then arranged on the bottom of the truck with the journal boxes positioned between the members 8 and with the flanges 18 on each of them positioned against the inner edges of the members 8. The bolts 19 and sleeve members 20 are then assembled in the lower ends of the members 8 and the car is then completely assembled and ready for use.

While I have shown and described one embodiment of my invention, it will be seen that this embodiment is merely for the purpose of illustration and description and that various other forms may be devised within the scope of my invention, as defined in the appended claims.

I claim:

1. A truck of the class described comprising a body portion consisting of a pair of longitudinally extending side sill members having an enclosed box-shaped cross section, an end sill member arranged across each end of said side sill members, means arranged between said side sill members and the end sill members for reenforcing the same, each of said side sill members having an opening arranged in the bottom side thereof at a point directly above where each of the axles of the truck is to be positioned, means arranged in each of said openings within said side sill members for housing the springs of said truck and extending therebelow for engaging with the journal boxes arranged on each end of said axles, and reenforcing means arranged on the outer sides of each of said last mentioned means and secured thereto and to said side sill members.

2. A truck of the class described comprising a body portion consisting of a pair of longitudinally extending side sill members, each of said side sill members comprising a plurality of metallic members welded together so as to provide side sill members having an enclosed substantially box-shaped cross section, an end sill member arranged across each end of said side sill members, means arranged between said side sill members and the end sill members for reenforcing the same, each of said side sill members having an opening arranged in the bottom side thereof at a point directly above where each of the axles of the truck is to be positioned, a pair of spaced apart vertically disposed parallel plate-like members arranged in each of the openings in said sill members having the top ends thereof abutting against the inner side of the top wall of said box-shaped side sill members so as to provide a housing for a coil spring therein and with the lower ends of said members extending downwardly from the bottom side of said side sill members so as to provide means for engaging with the journal boxes arranged on the ends of the axles.

3. A truck of the class described comprising a body portion consisting of a pair of longitudinally extending side sill members, each of said side sill members comprising a plurality of metallic members welded together so as to provide side sill members having an enclosed substantially box-shaped cross section, an end sill member arranged across each end of said side sill member, means arranged between said side sill members and the end sill members for reenforcing the same, each of said side sill members having an opening arranged in the bottom side thereof at a point directly above where each of the axles of the truck is to be positioned, and a pair of vertically disposed parallel spaced apart plate-like members arranged in each of the openings in said side sill members having the top ends thereof abutting against the inner side of the top wall of said side sill members so as to provide a box-shaped housing for a coil spring therein with the lower end portions of each pair of said members extending downwardly from the bottom side of said sill members so as to straddle the journal boxes arranged on each end of the axles and to guide the same in their vertical movement therebetween.

4. A truck of the class described comprising a body portion consisting of a pair of longitudinally extending side sill members having a box-shaped cross section, an end sill member arranged across each end of said side sill member, means arranged between said side sill members and the end sill members for reenforcing the same, each of said side sill members having an opening arranged in the bottom side thereof at a point directly above where each of the axles of the truck is to be positioned, and a pair of vertically disposed parallel spaced apart plate-like members arranged in each of the openings in said side sill members having the top ends thereof abutting against the inner side of the top wall of said side sill members so as to provide a box-shaped housing for a coil spring therein with the lower end portions of each pair of said members extending downwardly from the bottom side of said sill members so as to straddle the journal boxes arranged on each end of the axles and to guide the same in their vertical movement therebetween, a reenforcing member arranged between each of the vertically disposed plate-like members and the respective side sill members for reenforcing said plate-like members, and means for retaining the journal boxes in position therebetween.

5. A truck of the class described comprising a body portion consisting of a pair of longitudinally extending side sill members having a box-shaped cross section, an end sill member having a similar box-shaped cross section arranged across each end of said side sill members, means arranged between said side sill members and the end sill members for reenforcing the same, each of said side sill members having a substantially rectangular-shaped opening arranged in the bottom side thereof at a point directly above where each of the axles of the truck is to be positioned, a pair of spaced apart vertically disposed parallel plate-like members arranged in each of the rectangular-shaped openings in said side sill members having the top ends thereof abutting against the inner side of the top wall of the side sill members so as to provide a box-shaped housing for a coil spring therein with the lower end portions of each pair of said members extending downwardly from the bottom side of said side sill members so as to straddle the journal boxes arranged on each end of the axles and to guide the same in their vertical movement therebetween, a spring seating member arranged between the vertically disposed members in each of the spring housings in said side sill members next to the inner side of the top wall thereof, a reenforcing member arranged between each of the vertically disposed plate-like members and the respective side sill members for reenforcing said plate-like members, and means for retaining the journal boxes in position therebetween.

6. A truck of the class described comprising a body portion including a pair of longitudinally extending side sill members having a box-shaped cross section extending substantially throughout the length of the body portion, an end sill member arranged across each end of said side sill members, each of said side sill members having an opening arranged in the bottom side thereof at a point directly above where each of the axles of the truck is to be positioned, means arranged in each of the openings of said side sill members and extending therebelow so as to provide a housing for a coil spring therein and to hold the journal boxes arranged on the truck axles, said sill members together with said last mentioned means being securely welded respectively to each other so as to provide an integral welded body unit.

7. A truck of the class described comprising a body portion including a pair of longitudinally extending side sill members having a box-shaped cross section extending substantially throughout the length of the body portion, an end sill member arranged across each end of said side sill members, each of said side sill members having an opening arranged in the bottom side thereof at a point directly above where each of the axles of the truck is to be positioned, a pair of spaced apart vertically disposed parallel plate-like members arranged in each of said openings in said sill members so as to provide a housing for a coil spring therein between the upper portions of the vertically disposed members and with the lower end portions of said members extending downwardly from the bottom of said side sills so as to provide means for holding therebetween the journal boxes arranged on the truck axles, and means for reenforcing said vertically disposed members, said sill members together with said vertically disposed members and reenforcing means being welded respectively to each other so as to provide an integral welded body unit.

8. A truck of the class described comprising a body portion including a pair of longitudinally extending side sill members having a box-shaped cross section extending substantially throughout the length of the body portion, an end sill member arranged across each end of said side sill members, each of said side sill members having an opening arranged in the bottom side thereof at a point directly above where each of the axles of the truck is to be positioned, a pair of spaced apart vertically disposed parallel plate-like members arranged in each of said openings in said sill members so as to provide a housing for a coil spring therein between the upper portions of the vertically disposed members and with the lower end portions of said members extending downwardly from the bottom of said side sill members so as to provide means for holding therebetween the journal boxes arranged on the truck axles, a gusset member arranged between the outer lower end portion of each of said vertically disposed members and the bottom of the respective side sill members so as to reenforce said vertically disposed members.

9. A truck of the class described as defined in claim 8, wherein all of the sill members together with the vertically disposed plate-like members and the gusset members are all securely welded respectively to each other so as to provide an integral welded body unit.

THEODORE N. FRITZSCH.